No. 616,836. Patented Dec. 27, 1898.
J. H. GOSS.
VALVE FOR INFLATION.
(Application filed July 23, 1898.)

(No Model.)

Attest:
Howell Bartle
Nellie Callahan

Inventor:
John H. Goss,
by Wm. H. Fincrel,
his Atty.

THE NORRIS PETERS CO., PHOTO-LITHO., WASHINGTON, D. C.

UNITED STATES PATENT OFFICE.

JOHN H. GOSS, OF WATERBURY, CONNECTICUT, ASSIGNOR TO THE SCOVILL MANUFACTURING COMPANY, OF SAME PLACE.

VALVE FOR INFLATION.

SPECIFICATION forming part of Letters Patent No. 616,836, dated December 27, 1898.

Application filed July 23, 1898. Serial No. 686,727. (No model.)

*To all whom it may concern:*

Be it known that I, JOHN H. GOSS, a citizen of the United States, residing at Waterbury, in the county of New Haven and State of Connecticut, have invented a certain new and useful Improvement in Valves for Inflation, of which the following is a full, clear, and exact description.

This invention relates more especially to valves for inflating pneumatic tires and the like, in which the valve proper comprises a hollow spindle perforated laterally for the passage of the air and covered with a sleeve of rubber which normally closes the said valve, the said valve having a longitudinal movement to insert it and to provide for deflation. In this class of valves the spindle has been provided with a swell or shoulder at or near its outer end, about which the rubber sleeve is passed, and this shoulder, thus covered, seats in an appropriate recess in the shell or casing, so as to retain the injected air, the said recess limiting the inward travel of the spindle. It has been found that the rubber sleeve has been ruptured by too forcible seating of the shoulder of the spindle within this recess; and one main object of my invention is to so limit the inward movement of the spindle as to prevent such unduly forcible seating and the consequent rupture of the rubber sleeve which surrounds said spindle. This feature of my invention I accomplish by constructing the inner end of the spindle of an angular form to coöperate with a circular passage leading to the tire, so that when the angular point of the spindle is inserted in the circular passage the spindle will be restrained from further descent, and thus the sleeve relieved of undue pressure. The same thing may be accomplished by making the end of the spindle circular and the passage angular, preferably triangular. The provision of the angular point of the spindle or the angular passage in the casing affords also abundant space for the free passage of the air. Obviously it is advantageous to insert such a valve without rotation, so that the rubber may not be subjected to the grinding action that would follow rotation; and for this purpose my invention consists in providing the spindle with a nut to which the said spindle is swiveled, the nut rotating and the spindle being carried by it, but not necessarily rotating.

Figure 2:
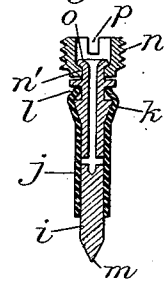
Figure 1:
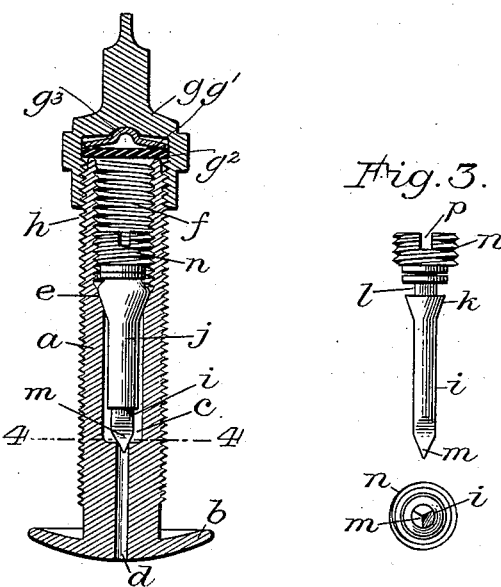
Figure 3:
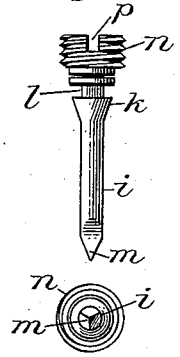
Figures 5, 7:
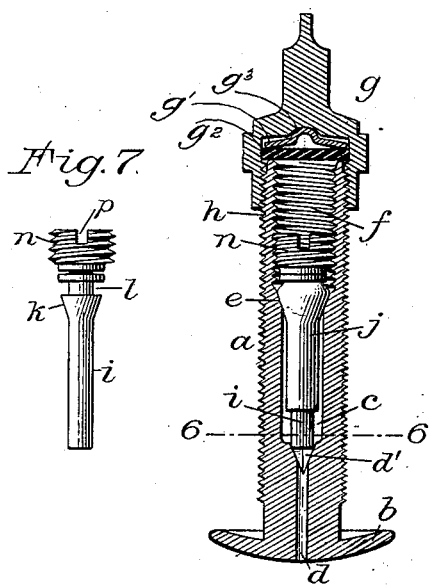
Figure 4:
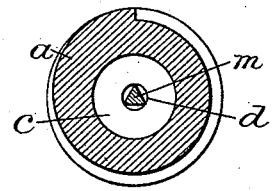
Figure 6:
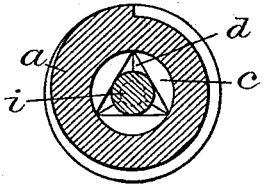

In the accompanying drawings, illustrating my invention, in the several figures of which like parts are similarly designated, Figure 1 is a longitudinal section of an ordinary form of inflation-valve shell or casing and cap with my improved valve in place and shown in elevation. Fig. 2 is a longitudinal section of my improved valve. Fig. 3 shows my spindle in elevation and inner end view. Fig. 4 is a greatly-enlarged cross-section taken in the plane of line 4 4, Fig. 1. Fig. 5 is a view similar to Fig. 1, showing a modification. Fig. 6 is a transverse section, greatly enlarged, taken in the plane of line 6 6, Fig. 5. Fig. 7 is an elevation of the valve-spindle of Figs. 5 and 6.

$a$ is the ordinary valve shell or casing, having a concaved or dished flange $b$ for coöperation with the tire or other article to which it is to be applied and also having the chamber $c$ for the valve and the air-inlet $d$, leading into the tire or other article to be inflated. The concaving or dishing of the flange $b$ gives a firm hold on the rubber of the tire. The chamber $c$ has the recess $e$ and beyond it the enlarged screw-threaded chamber $f$.

$g$ is a cap applied to the external screw-thread $h$ of the shell or casing and having a swivel-plate $g'$ arranged within it, and upon which rests the packing $g^2$, whereby the packing may fit the shell closer and the grinding action incident to screwing on the cap be minimized on the packing. This swivel-plate is of metal, having a teat $g^3$, by which it is seated or swiveled in the cap.

$i$ is the valve-spindle, made tubular, as shown, and with a lateral outlet extending to one or both sides and which is normally closed by the rubber sleeve $j$. This rubber sleeve is stretched over a shoulder $k$ and its outer end contracts in the groove $l$ to hold the sleeve in place. The point $m$ of the valve is made angular, preferably triangular, as shown more especially in Figs. 3 and 4, to coöperate with the circular channel $d$ to prevent the rotation of the spindle after the shoulder $k$ is seated in the recess $e$, thus to prevent undue pressure being brought upon the rubber and causing its rupture.

Instead of making the point of the spindle triangular it may be made round and flat, as in Figs. 5 to 7, and the entrance to the channel $d$ may be made angular or triangular, as shown at $d'$.

In order to provide for the insertion and removal of the valve, I employ a nut $n$ to travel in the screw-threaded chamber $f$, and this nut is made with a flange $n'$, over which the outer tubular end of the spindle is headed, as at $o$, in order to form a swivel connection between the spindle and its carrier-nut $n$ and so that the valve may be inserted and withdrawn by rotation of the nut without thereby necessarily rotating the spindle. By this construction the grinding of the rubber sleeve which would follow the rotation thereof is avoided.

The nut $n$ is provided with a nick $p$ to receive a screw-driver, or the screw-driver end of the cap, for inserting and removing the valve.

The angular spindle and its appropriate seat or the angular seat and the appropriate spindle, as already described, serve as a stop to limit the inward movement of the spindle, and the swivel-nut connection prevents rotation of the spindle as soon as the rubber bears upon the valve-casing. The stop prevents the cutting of the rubber sleeve by undue pressure and the swivel feature prevents the cutting of the rubber by rotation of the spindle.

What I claim is—

1. A valve for inflation, of the character described, having a shell or casing provided with an air-inlet, and a rotary tubular spindle, constructed with an angular point to coöperate with the air-inlet to prevent undue inward movement of the spindle, substantially as described.

2. A valve for inflation, comprising a shell or casing having an inlet for the passage of air into the object to be inflated, a tubular valve-spindle, and a rubber sleeve around it, the said inlet or spindle being angular in cross-section at the point of engagement, to prevent further inward movement of the spindle beyond a given point, substantially as described.

3. A valve for inflation, having a shell or casing provided with an internally-screw-threaded chamber, a flanged nut movable in and lengthwise of said chamber, a tubular valve-spindle swiveled to said nut, and having a lateral discharge, and a rubber sleeve around the said spindle, substantially as described.

In testimony whereof I have hereunto set my hand this 22d day of July, A. D. 1898.

JOHN H. GOSS.

Witnesses:
W. E. TWINING,
J. H. PILLING.